US007688190B2

(12) United States Patent
Lienenkamp

(10) Patent No.: US 7,688,190 B2
(45) Date of Patent: Mar. 30, 2010

(54) DEVICE FOR DISPLAYING A SELECTED GEAR

(75) Inventor: Jörg Lienenkamp, Witten (DE)

(73) Assignee: Gaslock GmbH, Iserlohn (DE)

( * ) Notice: Subject to any disclaimer, the term of this patent is extended or adjusted under 35 U.S.C. 154(b) by 517 days.

(21) Appl. No.: 11/629,226

(22) PCT Filed: Jun. 7, 2005

(86) PCT No.: PCT/DE2005/001017

§ 371 (c)(1),
(2), (4) Date: Jan. 23, 2007

(87) PCT Pub. No.: WO2005/121607

PCT Pub. Date: Dec. 22, 2005

(65) Prior Publication Data

US 2007/0247293 A1 Oct. 25, 2007

(30) Foreign Application Priority Data

Jun. 11, 2004 (DE) .................. 20 2004 009 307 U

(51) Int. Cl.
*B60Q 1/00* (2006.01)

(52) U.S. Cl. .................... 340/438; 340/425.5; 340/456

(58) Field of Classification Search ................ 340/438, 340/425.5, 426.34, 456, 457; 116/28.1; 200/61.88
See application file for complete search history.

(56) References Cited

U.S. PATENT DOCUMENTS

| | | | | |
|---|---|---|---|---|
| 4,439,158 | A | 3/1984 | Weber | |
| 5,017,916 | A * | 5/1991 | Londt et al. | 340/870.13 |
| 5,602,525 | A * | 2/1997 | Hsu | 340/456 |
| 5,904,068 | A | 5/1999 | Genise | |
| 5,957,001 | A * | 9/1999 | Gualtieri et al. | 74/473.12 |
| 6,246,127 | B1 * | 6/2001 | Weilbacher et al. | 307/9.1 |
| 6,508,139 | B2 * | 1/2003 | Onodera | 74/335 |
| 6,707,379 | B2 * | 3/2004 | Nagasaka | 340/456 |
| 6,930,594 | B1 * | 8/2005 | Wang | 340/456 |
| 7,482,912 | B2 * | 1/2009 | Ruttiger et al. | 340/439 |
| 2003/0188594 | A1 | 10/2003 | Levin et al. | |

FOREIGN PATENT DOCUMENTS

| | | |
|---|---|---|
| DE | 90 03 594 U1 | 7/1990 |
| DE | 39 39 030 A1 | 5/1991 |

* cited by examiner

*Primary Examiner*—Daryl Pope
(74) *Attorney, Agent, or Firm*—Collard & Roe, P.C.

(57) ABSTRACT

The invention relates to a device for displaying the selected gear in manual gearboxes of motor vehicles. The device comprises a display (6) and at least one acceleration sensor (7), which is situated on a gear lever (1), the inclination of the gear lever being measured.

5 Claims, 1 Drawing Sheet

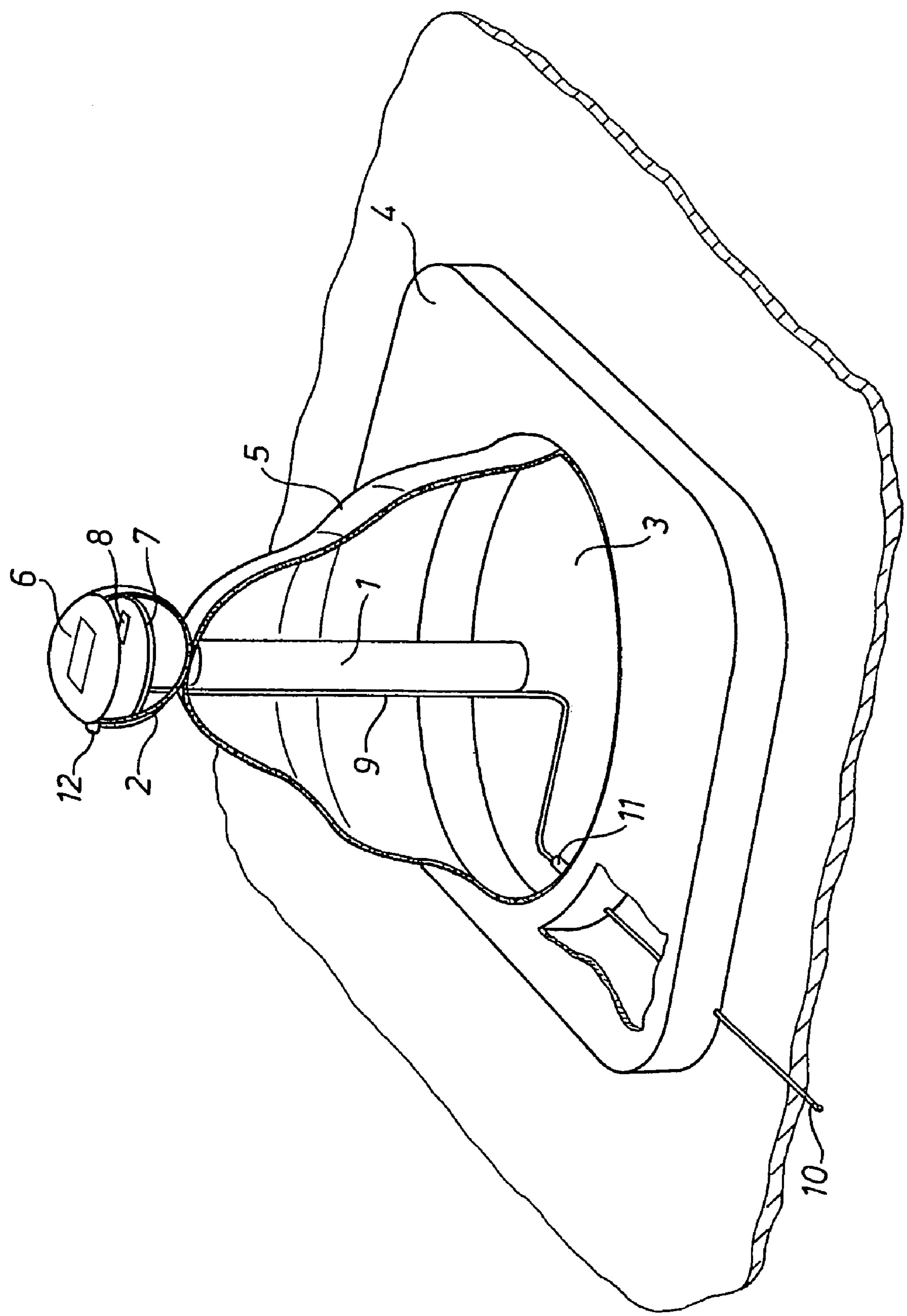
1
2
3
4
5
6
7
8
9
10
11
12

DEVICE FOR DISPLAYING A SELECTED GEAR

CROSS REFERENCE TO RELATED APPLICATIONS

Applicant claims priority under 35 U.S.C. §119 of German Application No. 20 2004 009 307.3 filed Jun. 11, 2004. Applicant also claims priority under 35 U.S.C. §365 of PCT/DE2005/001017 filed Jun. 7, 2005. The international application under PCT article 21(2) was not published in English.

BACKGROUND OF THE INVENTION

The invention relates to a device for displaying the selected gear in manual shift transmissions of motor vehicles.

In motor vehicles with manual shift transmissions, an illustration of the shift gate of the transmission is generally arranged on the selector knob, which illustration depicts the positions of the individual gears. This is intended to provide the vehicle driver with information regarding the gear to be selected. In motor vehicles with automatic transmissions, there is generally likewise a gear display, adjacent to the selector gate in which the selector lever is guided, which depicts the position of the individual drive positions. In automatic transmissions, there is often also a mechanical or electrical facility for indicating, on the selector gate, the respectively engaged drive position. However, as a result of an indication being provided on the selector gate, it is necessary to move one's view from the road to the selector gate, which is generally arranged in the center console of the vehicle, in order to check the selected drive position. This causes the vehicle driver to lose sight of the traffic situation, increasing the risk of an accident.

To eliminate this disadvantage, it is known in automatic transmissions to integrate a display for the selected drive position into the instrument cluster of the dashboard. Said displays are generally embodied as LCD or LED displays. As a result of their arrangement in the instrument cluster, only a slight movement of one's view from the traffic situation is necessary, resulting in the risk of an accident being reduced. The selected drive position is determined by means of sensors arranged in the transmission.

In manual shift transmissions of motor vehicles, devices for displaying the selected gear are also known in high-end vehicles which are equipped with so-called sequential transmissions. The display is also provided here in the region of the instrument cluster of the dashboard by means of an LCD or LED display. The selected gear is also determined here by means of transmission sensors.

Devices of said type are not provided in motor vehicles with manual shift transmissions without a sequential transmission. A display is however desirable in precisely these transmissions, since it is difficult to orientate oneself on account of the plurality of gears—modern passenger vehicles have six forward gears and one reverse gear and an idle position. This is true in particular for learner drivers or driving beginners who are not yet capable of recognizing, from the speed of the vehicle and the speed of the engine, which gear is selected. It is also difficult, as a result of the gears being situated very close to one another in modern vehicles, to recognize the selected gear from the position of the selector lever. An incorrect gear selection or an incorrect assumption regarding the selected gear can, however, lead to dangerous driving situations, in particular when crossing roads, turning into roads or during overtaking maneuvers.

SUMMARY OF THE INVENTION

The invention aims to remedy this. The invention is based on the object of providing a device which makes it possible to display the selected gear in manual shift transmissions of motor vehicles. The object is achieved according to the invention by a device for displaying the selected gear in manual shift transmissions of motor vehicles, which device comprises a display and at least one sensor which is arranged on a selector lever.

The invention provides a device in which it is possible to display the selected gear in manual transmissions of motor vehicles. This makes it easily possible for the vehicle driver to recognize which gear is selected. In this way, the risk of an incorrect gear being selected, or the risk of an assumption being made that another gear is selected, is considerably reduced. The arrangement of the sensor on the selector lever also provides the possibility of the device being retrofitted to vehicles, making the device a retrofittable driving aid in particular for beginner drivers and learner drivers. In addition, the possibility of retrofitting the device makes the latter a further accessory popular in particular among racing-minded young drivers.

In a refinement of the invention, the sensor is an acceleration sensor. The acceleration sensor is capable of measuring a very wide variety of types of accelerations, inter alia of measuring the force of gravity. The different angles of inclination of the selector lever in the individual gears results in a different measurement value from the sensor. In this way, it is possible to extremely precisely determine the angles of inclination and positions of the selector lever.

The display is advantageously integrated into the selector lever. This avoids the arrangement of an additional component; it moreover provides the possibility of providing the display simply by exchanging the selector knob provided on the selector lever.

In another refinement of the invention, the sensor and the display are integrated into the selector knob. This refinement provides the possibility of retrofitting the device according to the invention to the respective motor vehicle simply by exchanging the selector knob. Since the functional parts of the device can be completely integrated into the selector knob, it is necessary only to exchange the original selector knob for the selector knob containing the sensor and the display.

In an advantageous refinement of the invention, a second sensor is provided. It is possible by means of the second sensor to measure inclinations of the vehicle as a result of it traveling uphill or downhill and as a result of acceleration or deceleration, or lateral inclinations of the vehicle, which under some circumstances adversely affect the data gathered from the first sensor. The data measured by the sensors can then be compared with one another to ensure that the position of the selector lever is determined correctly.

A printed circuit board is preferably provided on the selector lever. The electronic components required for determining the selector positions and converting them into a display are provided on the printed circuit board. The printed circuit board is advantageously integrated into the selector knob, making it easier for the device to be retrofitted.

In one embodiment of the invention, a power source is provided. The power source is preferably a battery. This ensures a supply of power to the components of the device, in particular to the display and the sensor. The use of a battery, which can for example be a Mignon cell which can likewise be arranged on the printed circuit board, further simplifies the possibilities of retrofitting the device.

In another embodiment of the invention, a connection to the on-board electrical system of the motor vehicle is provided. This makes it possible to dispense with a power source in the form of a battery. This simultaneously ensures durable functionality of the device, since the power supply provided in the vehicle fails only in very few cases.

BRIEF DESCRIPTION OF THE DRAWING

Other embodiments and refinements of the invention are specified in the remaining subclaims. One exemplary embodiment of the invention is illustrated in the drawing and is described in detail in the following.

The single FIGURE of the drawing is a schematic illustration of a selector lever with a device for displaying the selected gear.

DESCRIPTION OF THE PRESENT INVENTION

The device for displaying the selected gear in manual shift transmissions of motor vehicles chosen as the exemplary embodiment has a selector lever 1 which is provided at one end with a selector knob 2. At its end which faces away from the selector knob 2, the selector lever 1 is guided in a selector gate 3 which is provided in a faceplate 4. In the exemplary embodiment, the selector gate 3 is round. In a modification of the exemplary embodiment, the selector gate 3 can also have a shape which corresponds to the paths for selecting the individual gears. The selector gate 3 is covered by a selector sleeve 5 which is provided, at its end which faces the selector knob 2, with a hole through which the selector lever 1 extends.

In the exemplary embodiment, the device for displaying the selected gear is integrated into the selector knob 2. Said device has a display 6 which is embodied as an LED display in the exemplary embodiment. An embodiment in the form of an LCD display is likewise possible. The display 6 can be in the shape of the selector knob 2 or can be arranged below a transparent cover which forms the shape of the selector knob 2. The device also comprises a sensor 7 which is arranged on a printed circuit board 8. The printed circuit board 8 is provided below the display 6. The printed circuit board 8 is also provided with circuits which convert the positions determined by the sensor 7, so that the display 6 shows the respectively selected gear.

The printed circuit board 8 is connected to a connecting line 9 which runs along the selector lever 1. The connecting line 9 merges into an on-board electrical system line 10, by means of which the device is supplied with electrical power. In a modification of the exemplary embodiment, it is possible to provide, for example on the printed circuit board 8, a power source in the form of a battery. The battery is preferably embodied as a Mignon cell. In this embodiment, the connection to the on-board electrical system can be dispensed with.

In the exemplary embodiment, a sensor 11 is provided on the faceplate 4. The sensor 11 is an acceleration sensor. The sensor 11 serves to measure inclinations of the vehicle as a result, for example, of it traveling uphill or downhill. The sensor 11 likewise measures positive and negative accelerations of the vehicle and inclinations of the vehicle as a result of cornering. The sensor 11 is attached at a point which is independent of the position of the selector lever 1. It is thus fixedly connected to the body and can therefore accurately measure the accelerations of the vehicle. In the exemplary embodiment, the sensor 11 is arranged on the bottom of the faceplate 4. The sensor 11 is connected to the connecting line 9 and to the on-board electrical system line 10. The determined data are conveyed to the printed circuit board 8 via the connecting line 9. A comparison between the data from the sensor 7 and the data from the sensor 11 then takes place on the printed circuit board 8, so that it is possible to eliminate measurement errors of the sensor 7 as a result of accelerations or inclinations of the vehicle.

The printed circuit board 8 is also provided with a button 12 which, in the exemplary embodiment, protrudes out of the selector knob 2. The button 12 assumes a so-called "teaching function". This serves to define the respective positions of the selector lever in the individual gears. After the device is first mounted, the user selects each gear separately and actuates the button 12 after selecting each gear. Here, the respective position of the selector lever is stored on the printed circuit board 8, so that the respective positions of the selector lever are defined for the individual gears. In a modification of the exemplary embodiment, it is also possible instead of the button 12 to provide a switch which is arranged in the extension of a bore formed in the selector knob. The "teaching function" is in this case carried out by actuating the switch with a pointed object, for example a ball-point pen or the like.

By integrating the components essential to the functionality of the device according to the invention into the selector knob, it is possible to retrofit the device according to the invention for displaying the selected gear simply by exchanging the selector knob originally provided in the vehicle. When a battery is used as a power source, such an exchange is possible within just a few minutes. However, it is also possible for the device to be mounted quickly and in a simple manner if the latter is connected to the on-board electrical system, since it is possible to tap the on-board electrical system line, for example the power supply to a cigarette lighter or the like, in the region of the centre console in which the selector gate is conventionally arranged. The arrangement of the second sensor 11 on a fixed part of the vehicle is also easily possible. Said sensor 11 can, for example, be adhered to the underside of the faceplate 4 and is therefore hidden from view. Similarly, the connecting line 9 for connecting the sensor 11 to the printed circuit board 8 is run along the selector lever 1 which is covered by the selector sleeve 5.

In a modification of the exemplary embodiment, it is possible to arrange the display 6 in the region of the instrument cluster of the dashboard. This makes it possible to have a gear display in the field of vision of the driver, so that it is not necessary to move one's view from the traffic situation in order to be able to read off the respectively selected gear. In new vehicles, it is possible for this purpose to use the gear displays already provided in vehicles with automatic transmissions.

The invention claimed is:

1. A device for displaying the selected gear in manual shift transmissions of motor vehicles, which device comprises a display (6) and at least one first sensor (7), which is arranged on a selector lever (1), whereby the first sensor (7) is an acceleration sensor, and a printed circuit board (8) is provided on the selector lever (1), wherein the first sensor (7) is integrated into a selector knob (2) of the selector lever (1), and that a second sensor (11) is provided, which is firmly connected with the car body and independent of the position of the selector lever (1).

2. The device as claimed in claim 1, wherein the display (6) is integrated into the selector lever (1).

3. The device as claimed claim 1, wherein the display (6) is integrated into a selector knob (2) of the selector lever (1).

4. The device as claimed in claim 1, wherein a power source is provided.

5. The device as claimed in claim 1, wherein a connection to the onboard electrical system of the motor vehicle is provided.

* * * * *